(12) United States Patent
Wright

(10) Patent No.: US 6,513,318 B1
(45) Date of Patent: Feb. 4, 2003

(54) LOW EMISSIONS GAS TURBINE ENGINE WITH INLET AIR HEATING

(75) Inventor: E. Scott Wright, Placitas, NM (US)

(73) Assignee: Hybrid Power Generation Systems LLC, Los Angeles, CA (US)

( * ) Notice: Subject to any disclaimer, the term of this patent is extended or adjusted under 35 U.S.C. 154(b) by 45 days.

(21) Appl. No.: 09/726,469

(22) Filed: Nov. 29, 2000

(51) Int. Cl.⁷ ................................................ F02C 7/10
(52) U.S. Cl. ................................................ 60/39.511
(58) Field of Search ........................... 60/39.5, 39.511, 60/39.52

(56) References Cited

U.S. PATENT DOCUMENTS

| 1,201,545 A | 10/1916 | Bischof |
| 2,322,987 A | * 6/1943 | West .................. 60/39.511 |
| 2,439,273 A | 4/1948 | Silvester |
| 2,441,751 A | 5/1948 | Broggi |
| 2,547,093 A | 4/1951 | Ray |
| 2,669,092 A | 2/1954 | Hammaren |
| 3,597,920 A | 8/1971 | Wadman |
| 3,785,145 A | 1/1974 | Amann |
| 3,871,343 A | 3/1975 | Nagai et al. |
| 4,182,119 A | 1/1980 | Hurley |
| 4,204,401 A | 5/1980 | Earnest |
| 4,271,664 A | 6/1981 | Earnest |
| 4,426,842 A | * 1/1984 | Collet .................. 60/39.511 |
| 4,598,542 A | 7/1986 | Reynolds |
| 4,754,607 A | 7/1988 | Mackay |
| 5,079,911 A | 1/1992 | Kumakura |
| 5,103,629 A | 4/1992 | Mumford et al. |
| 5,127,602 A | 7/1992 | Batey et al. |
| 5,355,074 A | 10/1994 | Nakano |
| 5,435,127 A | 7/1995 | Luffy et al. |
| 5,584,171 A | 12/1996 | Sato et al. |
| 5,740,786 A | 4/1998 | Gartner |
| 5,855,112 A | 1/1999 | Bannai et al. |
| 5,899,070 A | 5/1999 | Droessler et al. |
| 5,979,183 A | 11/1999 | Smith et al. |
| 6,050,080 A | 4/2000 | Horner |
| 6,065,280 A | 5/2000 | Ranasinghe et al. |
| 6,067,791 A | 5/2000 | Patel |

FOREIGN PATENT DOCUMENTS

| EP | 0472294 A1 | 7/1991 | |
| EP | 444913 | * 9/1991 | ................ 60/39.52 |
| WO | WO1-9709524 | 3/1997 | |

* cited by examiner

Primary Examiner—Louis J. Casaregola
(74) Attorney, Agent, or Firm—Sutherland Asbill & Brennan LLP

(57) ABSTRACT

A gas turbine engine includes, in flow series arrangement, a mixer, a compressor, a first flow path of a recuperator, a combustor, a turbine and a second flow path of said recuperator; and a bypass conduit between said turbine and said mixer. A valve is disposed in the conduit and is controlled by a temperature sensor mounted to sense compressor inlet air temperature. The sensor has a set point temperature that corresponds with optimum emissions from the engine. When the sensed temperature drops below the set point temperature the valve opens and hot air from the turbine flows to the mixer where it heats the air entering the compressor. A method for operating a gas turbine engine with preselected emissions over a range of ambient conditions is also disclosed.

6 Claims, 3 Drawing Sheets

LOW EMISSIONS GAS TURBINE ENGINE WITH INLET AIR HEATING

TECHNICAL FIELD

This invention relates generally to low emission gas turbine engines and in particular to a system and method for minimizing emissions from these engines.

BACKGROUND OF THE INVENTION

Air pollution concerns worldwide have led to stricter emissions standards requiring significant reductions in gas turbine pollutant emissions for both industrial and power generation applications burning either liquid or gaseous fuel.

Among other factors, the emissions from a gas turbine engine are dependent on the peak flame temperature in the engine's combustor. It is well known that higher peak flame temperatures result in lower carbon monoxide (CO) emissions and higher nitrous oxide (NOx) emissions while lower peak flame temperatures result in higher carbon monoxide emissions and lower nitrous oxide emissions. Depending on the type of fuel used, there is a peak flame temperature wherein the combination of carbon monoxide and nitrous oxide is minimized. This relationship is illustrated in FIG. 1 in which curves of CO and NOx emissions, in parts per million, are plotted versus peak flame temperature. From this curve an ideal peak flame temperature can be selected, represented by the dashed line, that corresponds to optimum emissions of the combination of CO and NOx. Alternatively, the desired peak flame temperature can be selected either to the left or right of dashed line for improved CO or NOx emissions at the expense of the other.

This relationship between peak flame temperature and emissions suggests that a control system can be developed for a gas turbine engine that would control on-peak flame temperature to maintain the engine at the optimum emissions point. There are, however, a number of obstacles that must be overcome to make such a control system practical. First, because flame temperatures are very high, on the order of 1900° F., (1038° C.), conventional thermocouples or other sensors used to measure peak temperature cannot operate in this harsh environment for very long and are prone to failure. Second, because the thermodynamics and fluid dynamics of the combustion process are very complex, it can be difficult to physically locate in the combustor where the peak flame temperature is. Furthermore, the location of the peak flame temperature may move within the combustor as the engine operating point changes. As a result, these temperature measuring devices end up being in the wrong location in the combustor or only in the correct location at one operating point of the engine. The consequence is that the engine ends up operating off of its optimum emissions point.

Accordingly, there is a need for a system and method for operating a gas turbine engine at its optimum emissions point that does not depend on flame temperature.

SUMMARY OF THE INVENTION

An object of the present invention is to provide a system and method for operating a gas turbine engine at its optimum emissions point that does not depend on flame temperature.

The present invention achieves this objective by providing a gas turbine engine comprising, in flow series arrangement, a mixer, a compressor, a first flow path of a recuperator, a combustor, a turbine and a second flow path of the recuperator, and a bypass conduit between the turbine and the mixer. A valve is disposed in the conduit and is controlled by a temperature sensor mounted to sense compressor inlet air temperature. The sensor has a set point temperature that corresponds with optimum emissions from the engine. When the sensed temperature drops below the set point temperature the valve opens and hot air from the turbine flows to the mixer where it heats the air entering the compressor.

A method for operating a gas turbine engine with preselected emissions over a range of ambient conditions is also disclosed. This method includes the steps of designing the gas turbine engine to operate at preselected emission levels at a preselected compressor inlet air temperature, sensing the compressor inlet air temperature, and when the sensed temperature is less than the preselected temperature heating the compressor inlet air until it returns to the preselected temperature and the engine returns to preselected emission levels.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

The following description of a gas turbine engine is made with respect to a single shaft recuperated engine having a single compressor and a single turbine. It should be appreciated that the present invention is applicable to gas turbine engines having multiple shafts with multiple compressors and turbines.

Figure 3:
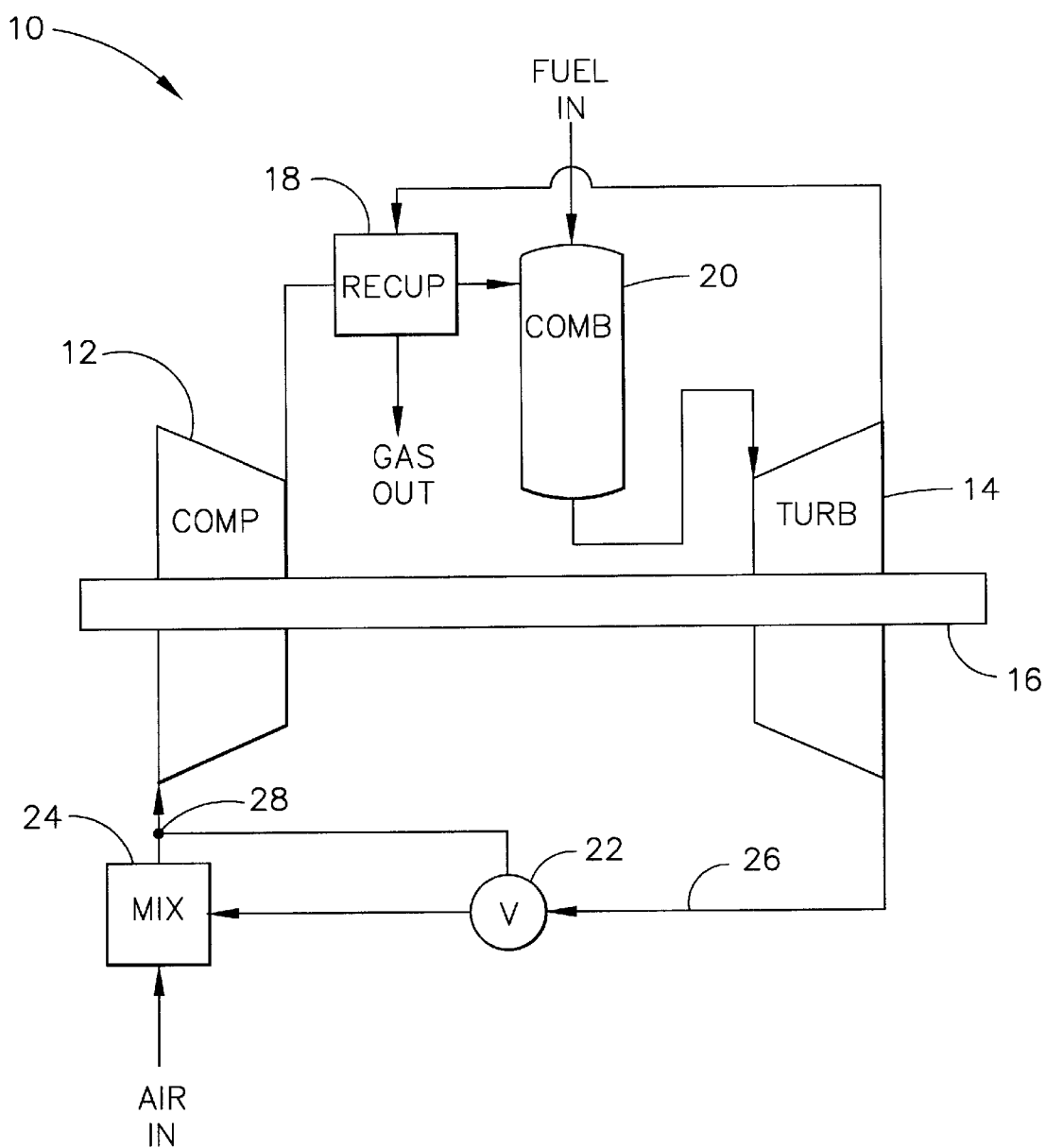
FIG. 3 is a schematic representation of a gas turbine engine having the emissions control system contemplated by the present invention.

Referring to FIG. 3, a gas turbine engine is generally denoted by reference numeral 10. The engine 10 has a compressor 12 and a turbine 14 mounted on a shaft 16. Disposed between the compressor 12 and the turbine 14 are a recuperator 18 and a combustor 20.

Figure 1:
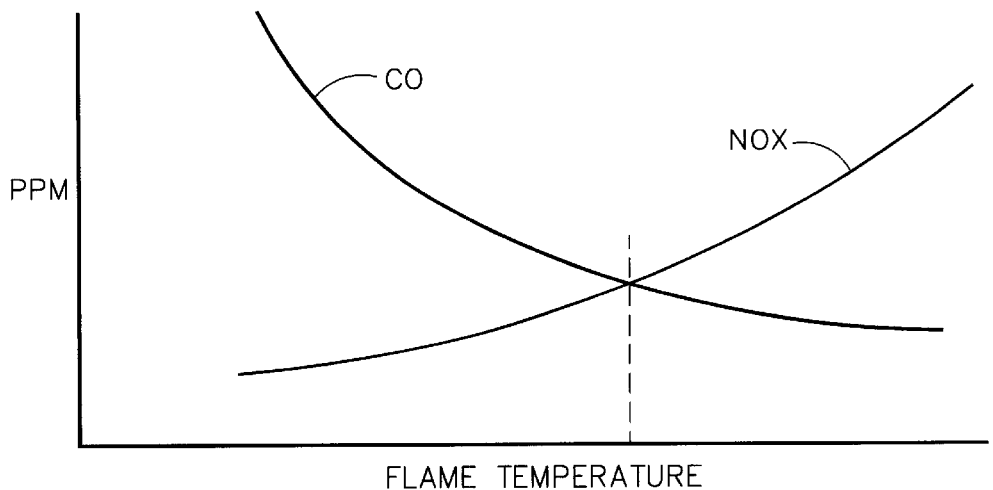
FIG. 1 is a graphical representation of emissions as a function of peak flame temperature.
Figure 2:
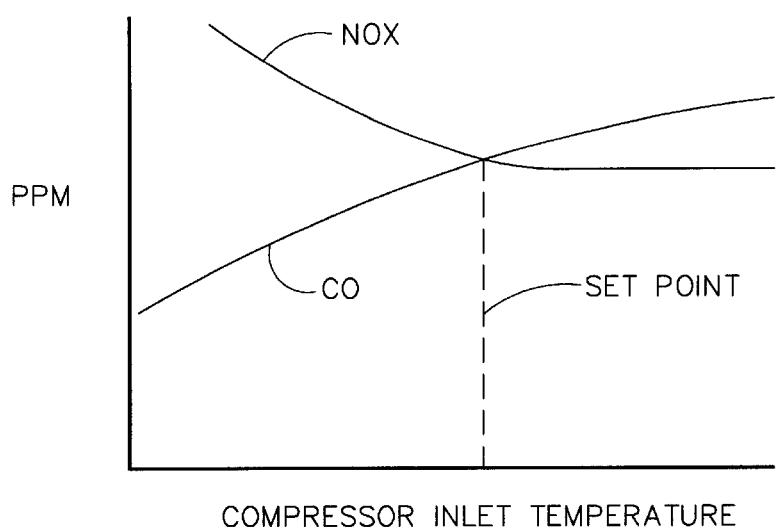
FIG. 2 is a graphical representation of emissions as a function of compressor inlet air temperature.

In operation, the compressor 12 ingests ambient air and compresses the air. The compressed or pressurized air flows through a first flowpath in the recuperator 18 and then into the combustor 20. In the combustor 20 the air and fuel are mixed and ignited to form a hot gas that is expanded across the turbine 14. The turbine 14 extracts energy from the gas and converts most of it into shaft horsepower for driving the shaft 16, which in turn drives the compressor 12. Most of the gas leaving the turbine 14, which is at a temperature in the range of 1200° F. (649° C.), flows back through the recuperator 18 where it flows through a second flowpath in heat exchange relationship with the first flowpath thus preheating the compressed air. From the recuperator 18 this gas is then exhausted to the surrounding environment or may be further used in cogeneration equipment to increase overall efficiency of the system. A small portion of the gas leaving the turbine 14 may flow through bypass conduit 26 to a mixer 24. A proportional valve 22 is disposed in the conduit 26 and controls the amount of gas flowing therethrough. In the preferred embodiment, the valve 22 has a stepper motor and is partially open most of the time. This flow is referred to as bypass flow as it bypasses the recuperator 18. The mixer 24 receives ambient air and delivers this air to the compressor 12. If the valve 22 is open, then the mixer 24 receives the bypass flow and mixes it with ambient air with the resultant mixture flowing to the compressor 12. A thermocouple 28, or other temperature measuring device such as a thermostat, senses the temperature of the compressor inlet air and sends a signal that controls the position of the valve 22. The sensor 28 includes an adjustable set-point temperature which in the preferred embodiment is 60° F., (15.6° C.). The set point temperature is selected from FIG. 2, represented by the dashed line, that corresponds to optimum emissions of the combination of CO and NOx. Alternatively, the set point temperature can be selected either to the left or right of dashed line for improved CO or NOx emissions at the expense of the other. If the sensed temperature is at or above the set point, the valve 22 is closed. When the sensed temperature drops below the set point, the valve 22 steps open until the compressor inlet temperature reaches the set point. The valve 22 then opens or closes incrementally to maintain the inlet temperature at the set point. Hot gas flows through conduit 26 into the mixer 24 where it heats the ambient air entering the mixer so that the air entering the compressor is maintained at the set point temperature thus assuring operation of the engine 10 with optimum emissions.

Figure 4:
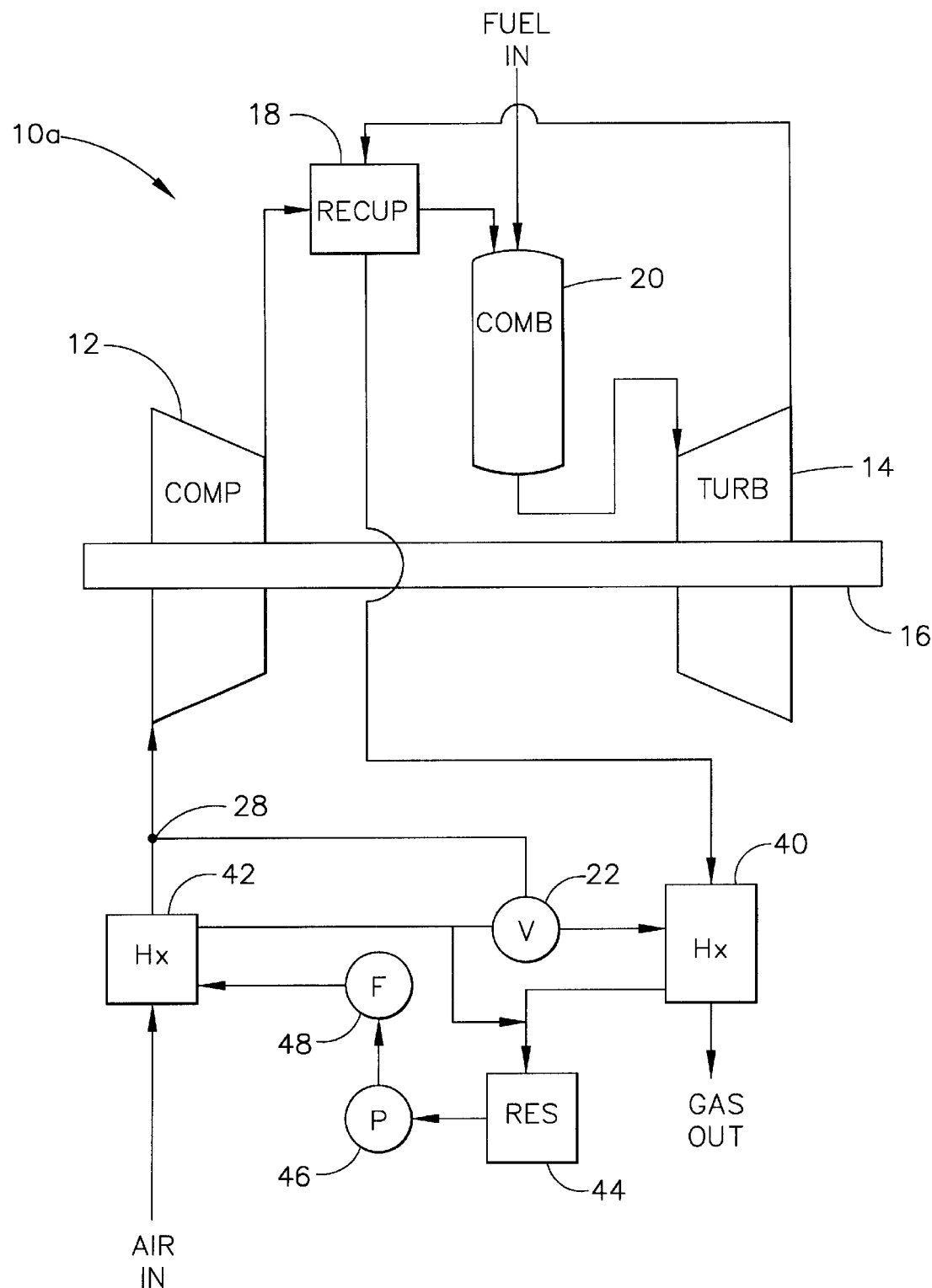
FIG. 4 is a schematic representation of a gas turbine engine having an alternative embodiment of the emissions control system contemplated by the present invention.

FIG. 4 shows an alternative embodiment of the present invention. Features in FIGS. 3 and 4 having the same reference numeral are the same and their description is not repeated here. In place of the mixer 24 and bypass conduit 26 of gas turbine engine 10, gas turbine engine 10*a* has a closed system comprising first and second heat exchangers 40, 42, a reservoir 44 filled with a liquid coolant such as polyalphaolefin or other coolant, a pump 46 and a filter 48. The hot gas from the recuperator 18 flows through one of the flow paths in the heat exchanger 40 and ambient air flows through one of the flow paths in the heat exchanger 42. As with engine 10, the set point temperature for the sensor 28 is set at 60° F. (15.6° C.). When the compressor inlet air temperature is the same as the set point temperature, the valve 22 is closed and the pump 46 circulates the liquid between the reservoir 44 and the heat exchanger 42, or alternatively, the pump is turned off. When the sensed temperature drops below the set point temperature, the valve 22 and the pump (if not turned on, is turned on) opens and a portion of the liquid coolant flows through a second flowpath in the heat exchanger 40 where it is heated. The heated liquid flows to the reservoir 44 and heats the reservoir. From the reservoir 44, the heated coolant flows through a second flowpath in heat exchanger 42 where it heats the ambient air flowing to the compressor 12. Thus, as the ambient temperature drops, the air entering the compressor 12 is heated so that the engine continues to operate at its optimum emissions level.

Thus a system and method for operating a gas turbine engine at its optimum emissions point that does not depend on measuring flame temperature is provided. With the present invention, during the design of the engine, the emissions characteristics of the combustor 20 can be optimized by the use of swirlers and/or hole patterns at the set point of the sensor 28. Then when the engine operates at a compressor inlet air temperature below this set point, the present invention allows the engine to continue to operate with optimum emissions.

Various modifications and alterations to the above-described preferred and alternate embodiments will be apparent to those skilled in the art. Accordingly, these descriptions of the invention should be considered exemplary and not as limiting the scope of the invention as set forth in the following claims.

What is claimed is:

1. A gas turbine engine comprising, in flow series arrangement, a mixer, a compressor, a first flow path of a recuperator, a combustor, a turbine and a second flow path of said recuperator; and a bypass conduit between said turbine and said mixer.

2. The gas turbine engine of claim 1 further comprising a valve disposed in said conduit.

3. The gas turbine engine of claim 2 further comprising a temperature sensor mounted to sense compressor inlet air temperature and having a set point temperature.

4. The gas turbine engine of claim 3 wherein said temperature sensor is configured so that when the sensed temperature is below the set point temperature the valve is open.

5. The gas turbine engine of claim 3 wherein said valve is controlled by an electronic control unit of the engine in response to a signal from said temperature sensor.

6. The gas turbine engine of claim 2 wherein said valve is proportionately controlled as a function of compressor inlet temperature.

* * * * *